(12) United States Patent
Goergen et al.

(10) Patent No.: US 12,275,320 B2
(45) Date of Patent: Apr. 15, 2025

(54) SYSTEM AND METHOD FOR ELECTRIC VEHICLE CHARGING AND SECURITY

(71) Applicant: Cisco Technology, Inc., San Jose, CA (US)

(72) Inventors: Joel Richard Goergen, Soulsbyville, CA (US); Chad M. Jones, Doylestown, OH (US); Robert Gregory Twiss, Chapel Hill, NC (US)

(73) Assignee: CISCO TECHNOLOGY, INC.

( * ) Notice: Subject to any disclaimer, the term of this patent is extended or adjusted under 35 U.S.C. 154(b) by 0 days.

(21) Appl. No.: 18/331,350

(22) Filed: Jun. 8, 2023

(65) Prior Publication Data

US 2023/0311685 A1   Oct. 5, 2023

Related U.S. Application Data

(63) Continuation of application No. 17/003,745, filed on Aug. 26, 2020, now Pat. No. 11,745,613.

(51) Int. Cl.
| | |
|---|---|
| *H02J 7/00* | (2006.01) |
| *B60L 53/16* | (2019.01) |
| *B60L 53/30* | (2019.01) |
| *B60L 53/35* | (2019.01) |
| *B60S 3/04* | (2006.01) |

(Continued)

(52) U.S. Cl.
CPC ............. *B60L 53/305* (2019.02); *B60L 53/16* (2019.02); *B60L 53/35* (2019.02); *B60S 3/04* (2013.01); *G06F 21/32* (2013.01); *G06F 21/86* (2013.01); *H02J 7/00045* (2020.01); *H02J 7/0013* (2013.01); *H02J 7/0045* (2013.01); *H02J 7/04* (2013.01); *B60L 2210/30* (2013.01); *H02J 7/00711* (2020.01); *H02J 2207/20* (2020.01)

(58) Field of Classification Search
CPC ........ B60L 53/305; B60L 53/35; B60L 53/16; H02J 7/00045; H02J 7/0013
USPC .................................................. 320/109, 134
See application file for complete search history.

(56) References Cited

U.S. PATENT DOCUMENTS

| | | | | |
|---|---|---|---|---|
| 5,306,999 | A | * | 4/1994 | Hoffman ................. B60L 53/16 320/109 |
| 5,523,666 | A | * | 6/1996 | Hoelzl .................... B60L 53/35 320/109 |

(Continued)

FOREIGN PATENT DOCUMENTS

| | | |
|---|---|---|
| CN | 1209880 C | 7/2005 |
| CN | 204836199 U | 12/2015 |

(Continued)

OTHER PUBLICATIONS

Alexander C.K., "Fundamentals of Electric Circuits," Indian Edition, MATLAB Examples, 2013, 37 Pages.

(Continued)

*Primary Examiner* — Alexis B Pacheco

(57) ABSTRACT

In one embodiment, an apparatus includes a power source and a moveable charging arm coupled to the power source and comprising a charging plate for contact with an electric vehicle contact plate. The charging arm is operable to transmit direct current (DC) pulse power with testing performed between high voltage pulses directly from the charging plate to the electric vehicle contact plate to charge one or more batteries at the electric vehicle. A method for charging the electric vehicle is also disclosed herein.

20 Claims, 12 Drawing Sheets

(51) Int. Cl.
*G06F 21/32* (2013.01)
*G06F 21/86* (2013.01)
*H02J 7/04* (2006.01)
*H02J 7/14* (2006.01)

(56) References Cited

U.S. PATENT DOCUMENTS

| | | | |
|---|---|---|---|
| 5,617,003 | A | 4/1997 | Odachi et al. |
| 5,710,502 | A | 1/1998 | Poumey |
| 5,821,731 | A * | 10/1998 | Kuki .................. B60L 53/14 320/108 |
| 5,850,135 | A * | 12/1998 | Kuki .................. B60L 53/665 320/108 |
| 7,031,805 | B2 * | 4/2006 | Lee ..................... G05D 1/0246 700/258 |
| 7,420,355 | B2 | 9/2008 | Liu et al. |
| 7,566,987 | B2 | 7/2009 | Black et al. |
| 8,310,089 | B2 | 11/2012 | Schindler et al. |
| 8,638,008 | B2 | 1/2014 | Baldwin et al. |
| 8,768,528 | B2 | 7/2014 | Millar et al. |
| 8,781,637 | B2 | 7/2014 | Eaves |
| 9,419,436 | B2 | 8/2016 | Eaves et al. |
| 9,428,070 | B2 | 8/2016 | Bell et al. |
| 9,834,102 | B2 | 12/2017 | Nakaya |
| 9,873,347 | B2 * | 1/2018 | Brown .................. B60L 53/36 |
| 10,166,882 | B2 | 1/2019 | Yang et al. |
| 10,263,526 | B2 | 4/2019 | Sandusky et al. |
| 10,281,513 | B1 | 5/2019 | Goergen et al. |
| 10,286,799 | B2 * | 5/2019 | Namou .................. B60L 53/30 |
| 10,343,535 | B2 * | 7/2019 | Cook .................... B60L 53/38 |
| 10,407,995 | B2 | 9/2019 | Moeny |
| 10,442,300 | B2 | 10/2019 | Huston et al. |
| 10,532,667 | B2 | 1/2020 | Chen et al. |
| 10,541,543 | B2 | 1/2020 | Eaves |
| 10,541,758 | B2 | 1/2020 | Goergen et al. |
| 10,631,443 | B2 | 4/2020 | Byers et al. |
| 10,672,537 | B2 | 6/2020 | Goergen et al. |
| 10,680,836 | B1 | 6/2020 | Sironi et al. |
| 10,732,688 | B2 | 8/2020 | Goergen et al. |
| 10,735,105 | B2 | 8/2020 | Goergen et al. |
| 10,763,749 | B2 | 9/2020 | Arduini et al. |
| 10,809,134 | B2 | 10/2020 | Bullock et al. |
| 10,958,471 | B2 | 3/2021 | Goergen et al. |
| 2008/0198635 | A1 | 8/2008 | Hussain et al. |
| 2010/0039067 | A1 * | 2/2010 | Hill ...................... B60L 5/42 320/109 |
| 2010/0201309 | A1 * | 8/2010 | Meek .................. B60L 53/34 701/1 |
| 2011/0057612 | A1 | 3/2011 | Taguchi et al. |
| 2011/0148350 | A1 * | 6/2011 | Wegener ............ B60L 53/12 320/108 |
| 2011/0216452 | A1 * | 9/2011 | Haines .................. H02H 3/16 361/42 |
| 2012/0043935 | A1 | 2/2012 | Dyer et al. |
| 2012/0266914 | A1 | 10/2012 | Van Dyke et al. |
| 2016/0272074 | A1 * | 9/2016 | McGrath .............. B60L 58/40 |
| 2016/0294568 | A1 | 10/2016 | Chawgo et al. |
| 2017/0297437 | A1 * | 10/2017 | Kim ...................... H04B 5/79 |
| 2018/0098201 | A1 | 4/2018 | Torello et al. |
| 2018/0123360 | A1 | 5/2018 | Eaves |
| 2018/0313886 | A1 | 11/2018 | Mlyniec et al. |
| 2019/0072618 | A1 * | 3/2019 | Ghantous ............... H02J 7/005 |
| 2019/0120910 | A1 * | 4/2019 | Ghantous ............. G01R 31/392 |
| 2019/0272011 | A1 | 9/2019 | Goergen et al. |
| 2019/0280895 | A1 | 9/2019 | Mather et al. |
| 2019/0363493 | A1 | 11/2019 | Sironi et al. |
| 2020/0233472 | A1 | 7/2020 | Jones et al. |
| 2020/0376983 | A1 * | 12/2020 | Titus .................. H02J 7/007192 |
| 2021/0354575 | A1 * | 11/2021 | Vahedi .................. H02J 7/0032 |
| 2022/0032804 | A1 | 2/2022 | Goergen et al. |

FOREIGN PATENT DOCUMENTS

| | | |
|---|---|---|
| CN | 104081237 B | 10/2016 |
| CN | 104412541 B | 5/2019 |
| WO | 2011078397 A1 | 6/2011 |

OTHER PUBLICATIONS

"Audio/video, Information and Communication Technology Equipment-Part 1: Safety requirements," International Standard, IEC 62368-1, Edition 2.0, Feb. 2014, 680 Pages, ISBN 978-2-8322-1405-3.

Eaves S.S., "Network Remote Powering Using Packet Energy Transfer," Proceedings of IEEE International Conference on Telecommunications Energy (INTELEC), Sep. 30, 2012-Oct. 4, 2012, Scottsdale, AZ, 4 Pages.

Edelstein S., "Updated 2016 Tesla Model S Also Gets New 75-kWh Battery Option," Voltserver Exhibit 1018, May 5, 2016, 3 Pages, Archived on Jun. 19, 2016 by Internet Archive Wayback machine at https://web.archive.org/web/20160619001148/https://www.greencarreports.com/news/1103782_updated-2016-tesla-model-s-also-gets-new-75-kwh-battery-option.

Hall S.H., "High-Speed Digital System Design, A Handbook of Interconnect Theory and Design Practices," Voltserver Exhibit 1030, Sep. 2000, 55 Pages.

Information Technology Equipment-Safety- Part 1: General requirements, International Standard, IEC 60950-1, Edition 2.2, May 2013, 648 pages, ISBN 978-2-8322-0820-5.

Lathi B.P., et al., "Modern Digital and Analog Communication Systems," Fourth Edition, Jan. 2009, 15 pages.

"Effects of current on human beings and livestok—Part 1: General aspects," Technical Specification, Basic Safety Publication, IEC/TS 60479-1, Edition 4.0, Jul. 2005, 122 pages, ISBN 2-8318-8096-3.

Low-voltage switchgear and controlgear-Part 1: General rules, International Standard, Amendment 2, IEC 60947-1, Edition 5.0, Sep. 2014, 106 Pages, ISBN 978-2-8322-1798-6.

Microsemi, "Understanding 802.3at PoE Plus Standard Increases Available Power," Jun. 2011, pp. 1-7.

"NFPA 70: National Electrical Code," Voltserver Exhibit 1019, 2017 Edition, 881 Pages.

Petition for Post Grant Review of U.S. Pat. No. 10,735,105 [Public] with Exhibits, filed Feb. 16, 2021, PGR 2021-00055, 132 Pages.

Petition for Post Grant Review of U.S. Pat. No. 10,735,105 [Public] with Exhibits, filed Feb. 16, 2021, PGR 2021-00056, 116 Pages.

Sedra A.S., "Microelectronic Circuits," Oxford, Seventh Edition, Jan. 2015, Published on 2014, 38 Pages.

Stallings W., "Data and Computer Communications," Voltserver Exhibit 1028, Fourth Edition, Jan. 1994, 14 Pages.

Tanenbaum A.S., "Computer Networks," Voltserver Exhibit 1027, Third Edition, Mar. 1996, 12 Pages.

* cited by examiner

SYSTEM AND METHOD FOR ELECTRIC VEHICLE CHARGING AND SECURITY

CROSS REFERENCE TO RELATED APPLICATION

This application is a continuation of U.S. application Ser. No. 17/003,745, filed Aug. 26, 2020, now U.S. Pat. No. 11,745,613, the contents of which is incorporated herein by reference in its entirety.

TECHNICAL FIELD

The present disclosure relates generally to electric vehicles, and more particularly, to charging electric vehicles and security for an electrical vehicle power and communications system.

BACKGROUND

Electric vehicle (EV) charging systems and security are both challenging problems. Rapid, efficient, and safe charging is desired along with security.

BRIEF DESCRIPTION OF THE DRAWINGS

Corresponding reference characters indicate corresponding parts throughout the several views of the drawings.

DETAILED DESCRIPTION

Overview

Figure 1:
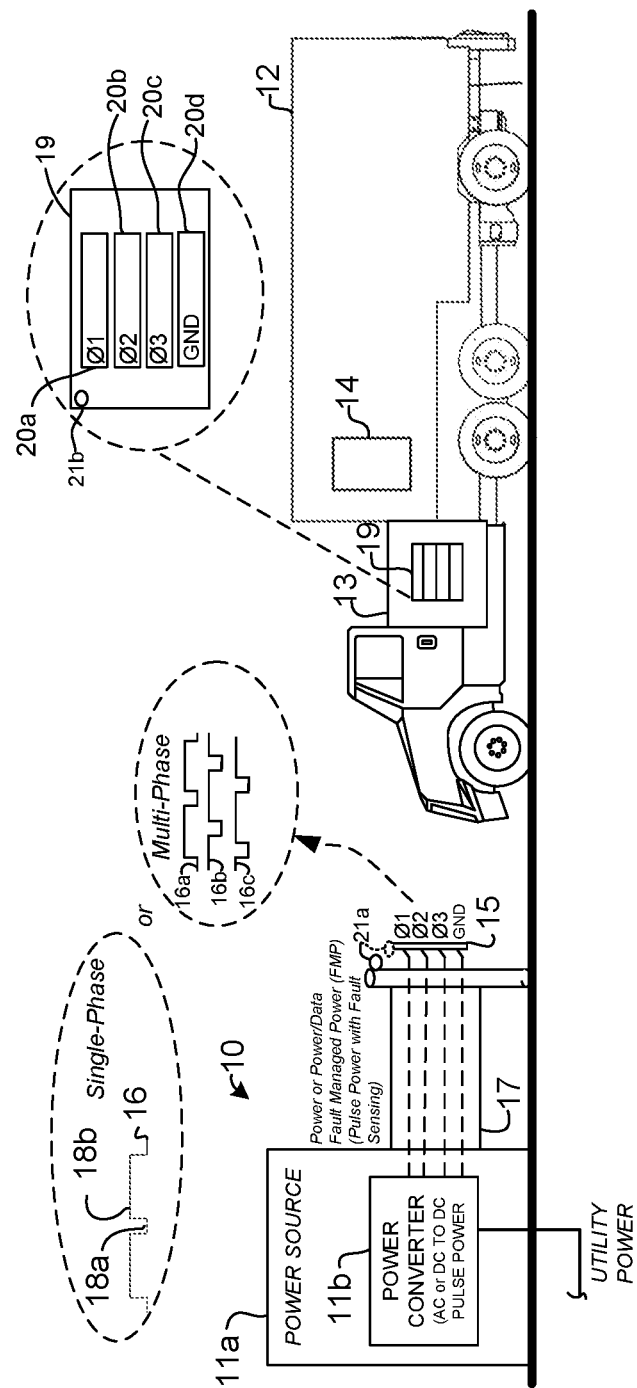
FIG. 1 is an example of an electric vehicle charging station and electric vehicle, in accordance with one embodiment.

In one embodiment, an apparatus generally comprises a power source and a moveable charging arm coupled to the power source and comprising a charging plate for contact with an electric vehicle contact plate. The charging arm is operable to transmit direct current (DC) pulse power with testing performed between high voltage pulses, directly from the charging plate to the electric vehicle contact plate to charge one or more batteries at the electric vehicle.

In another embodiment, an electric vehicle system generally comprises a power system for charging a battery installed in an electric vehicle and a contact plate for positioning on an exterior surface of the electric vehicle and transmitting power to the power system. The contact plate is configured for receiving pulse power comprising a plurality of high voltage pulses with safety testing between the high voltage pulses, directly from a charging plate coupled to a charging arm at a charging station and transmitting the pulse power to the power system.

In yet another embodiment, a method generally comprises identifying an electric vehicle in a charging station, automatically positioning a charging arm in contact with a contact plate on an exterior surface of the electric vehicle, verifying compatibility of a power system at the electric vehicle with fault managed power, performing authentication between the charging station and the electric vehicle, and charging a battery at the electric vehicle with the fault managed power.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Electric vehicle (EV) charging systems are often slow and lack security needed to prevent damage to the charging station or electric vehicle. Data collection for offload processing may also be desired during charging at speeds greater than available with Wi-Fi or cellular means.

The embodiments described herein provide electric vehicle charging, which may be combined with data communications and authentication to efficiently and effectively support an electric vehicle or electric vehicle based data center. As described below, power and data may be provided through the use of Fault Managed Power (FMP).

The term "Fault Managed Power" (FMP) (also referred to as Extended Safe Power (ESP)) as used herein refers to high-power (e.g., >100 W), high voltage (e.g., >56V) operation with DC (direct current) pulse power delivered on one or more wires or wire pairs. As described below, power and data is transmitted together (in-band) on at least one wire pair. FMP also includes fault detection (e.g., fault detection (safety testing) at initialization and between high voltage pulses) and pulse synchronization between power sourcing equipment (PSE) and a powered device (PD). The power may be transmitted with communications (e.g., bi-directional communications) or without communications.

The term "pulse power" (also referred to as "pulsed power") as used herein refers to DC power that is delivered in a sequence of pulses (alternating low direct current voltage state and high direct current voltage state) in which the voltage varies between a very small voltage (e.g., close to 0V, 3V) during a pulse-off interval and a larger voltage (e.g., >12V, >24V) during a pulse-on interval. High voltage pulse power (e.g., >56 VDC, >60 VDC, >300 VDC, −108 VDC, −380 VDC) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety. Pulse power transmission may be through cables, transmission lines, bus bars, backplanes, PCBs (Printed Circuit Boards), and power distribution systems, for example. It is to be understood that the power and voltage levels described herein are only examples and other levels may be used.

As noted above, safety testing (fault sensing) may be performed through a low voltage safety check between high voltage pulses in the pulse power system. Fault sensing may include, for example, line-to-line fault detection with low voltage sensing of the cable or components and line-to-ground fault detection with midpoint grounding. The time between high voltage pulses may be used, for example, for line-to-line resistance testing for faults and the pulse width may be proportional to DC (Direct Current) line-to-line voltage to provide touch-safe fault protection. The testing (fault detection, fault protection, fault sensing, touch-safe protection) may comprise auto-negotiation between power components. The high voltage DC pulse power may be used with a pulse-to-pulse decision for touch-safe line-to-line fault interrogation between pulses for personal safety. For example, the high voltage pulse may have a width corresponding to 0.5 ms (milliseconds) with a 1 ms period at initialization, and an 8 ms high voltage pulse with a 12 ms period during normal operation to limit exposure time and provide safe operation.

In one or more embodiments, FMP (FMP/ESP) may comprise pulse power transmitted in multiple phases in a multi-phase pulse power system with pulses offset from one another between wires or wire pairs to provide continuous power. One or more embodiments may, for example, use multi-phase pulse power to achieve less loss, with continuous uninterrupted power with overlapping phase pulses, as described in U.S. patent application Ser. No. 16/380,954 ("Multiple Phase Pulse Power in a Network Communications System"), filed Apr. 10, 2019, which is incorporated herein by reference in its entirety.

As described below, FMP may be converted into Power over Ethernet (PoE) and used to power electrical components within the electric vehicle. In one or more embodiments, power may be supplied using Single Pair Ethernet (SPE) and may include data communications (e.g. 1-10 GE (Gigabit Ethernet)). The power system may be configured for PoE (e.g., conventional PoE or PoE+ at a power level<100 watts (W), at a voltage level<57 volts (V), according to IEEE 802.3af, IEEE 802.3at, or IEEE 802.3bt), Power over Fiber (PoF), advanced power over data, FMP, or any other power over communications system in accordance with current or future standards, which may be used to pass electrical power along with data to allow a single cable to provide both data connectivity and electrical power to components (e.g., battery charging components, server data components, electric vehicle components).

Referring now to the drawings, and first to FIG. 1, a drive-thru charging station, generally indicated at 10, and electric vehicle 12 are shown in accordance with one embodiment. In this example, the electric vehicle 12 comprises a truck with a battery compartment 13 comprising one or more batteries (not shown). As described below with respect to FIG. 8, the electric vehicle 12 may be configured to operate in an EV data center (mobile data center) and comprise any number of server appliances in a server appliance rack 14 (servers and associated network components as described below). The charging station 10 is configured to provide power or power and data communications over one or more charging arms 15. The charging arm 15 may be coupled to a power (power and data) source 11 *a* over cable 17. The power source 11 *a* may receive utility power (e.g., 480 VAC (alternating current) or other suitable AC or DC power (utility, solar, wind, etc.)) and convert the received power to FMP (DC pulse power with fault sensing) at power converter 11 *b*. In the example shown in FIG. 1, the charging arm 15 is configured for transmitting three-phase pulse power (phases Ø1, Ø2, Ø3 and ground (GND)) FMP.

In one or more embodiments, the charging station (apparatus) 10 comprises the power source 11 *a* and the moveable charging arm 15 coupled to the power source and comprising a charging plate for contact with an electric vehicle contact plate 19. The charging arm is operable to transmit direct current (DC) pulse power with testing performed between high voltage pulses, directly from the charging plate to the electric vehicle contact plate to charge one or more batteries at the electric vehicle 12.

As previously described, FMP utilizes pulse power with testing between high voltage pulses to provide a safe high-power distribution system. FMP allows for the transfer of 380 VDC or other DC voltage between a source and destination using pulse power and evaluating safety between high voltage pulses. As shown in the simplified voltage trace 16 of FIG. 4, single-phase FMP comprises a plurality of voltage pulses (sequence of voltage pulses) in which voltage varies between a small voltage during a pulse-off time 18 *a* and a larger voltage during a pulse-on time (high voltage pulse) 18 *b*. The FMP may be transmitted as single-phase pulse power over a wire pair or as multi-phase pulse power over multiple wire pairs (e.g., three-phases 16 *a*, 16 *b*, 16 *c*) as shown schematically in FIG. 1. The safety testing between high voltage pulses in the FMP system allows the power source 11 *a* to shut down automatically when power wires are exposed to an unintentional load such as from contact with a person. This allows direct contact charging to be performed safely between the charging plate at the charging arm 15 and the EV contact plate 19.

As described below, the FMP based system may also support GE (Gigabit Ethernet) data transfer over a single twisted pair, for example. The system provides for fast data analytic off-loading and moving of server data or other data intensive communications activity using 1 GE, 10 GE, or other speed communications over FMP wiring while the EV batteries are charging.

As shown in FIG. 1, the EV (truck) 12 comprises the charging plate 19 coupled to an EV power system and mounted (e.g., removable mounted) on one or more sides of the truck for direct contact with one or more charging arms 15 of the charging station. In this example, the charging plate 19 comprise four contact plates 20 *a*, 20 *b*, 20 *c*, 20 *d* corresponding to the three phases of the multi-phase pulse power and ground. It is to be understood that the three-phase pulse power shown in FIG. 1 is only an example, and the charging station 10 and EV 12 may be configured for single-phase or multi-phase (2, 3, 4, or more phases). As described below, the charging arm 15 (or arms) may be positioned for contact with the contact plate 19 on one side of the EV 12 or both sides of the EV.

The charging arms 15 may be automatically adjusted based on the location of the contact plate 19 on the EV 12 or the size of the EV. For example, the EV 12 may communicate with the charging station to identify the type of EV, size of EV, location of the contact plate, or any other information for use by the charging station in positioning the charging arm 15. In one or more embodiments, the charging station 10 may include a sensor 21 *a* for automatically positioning the charging arm 15 for contact with the electric vehicle contact plate 19. For example, the sensor 21 *a* may be located on the charging arm 15 or other portion of charging station 10 for use in detecting the location of the contact plate 19 based on a corresponding switch 21 *b* on the contact plate 19 or other location on the electric vehicle 12. Various mechanisms may be used to properly position and align the charging arms 15 with respect to the contact plate 19, including for example, a switch (magnetic switch, mechanical switch, optical switch) 21 *b* that may be used to identify the location of the contact plate 19 on the electric vehicle 12. In one or more embodiments, a GPS (Global Positioning System) may be used to identify the electric vehicle 12 approaching the charging station 10 and the location of the charging plate 19 (e.g., height, number of charging plates, position) may be transmitted by a communications device to the charging station 10 by the electric vehicle 12 as it enters the charging station. The charging arm 15 may be operable to retract as the electric vehicle is entering or leaving the charging station and extend once the electric vehicle is properly positioned. As described below, the arm 15 may be forced into contact with the EV contact plate 19 through the use of one or more compressible members (e.g., springs). In the example shown in FIG. 1, all equipment is located on one or both sides of the electric vehicle 12, the charging arm 15 is positioned above ground, and there are no magnetic or electrical fields generated for charging. Details of the charging arm 15 and contact plate 19 are described below with respect to FIGS. 3-6.

Figure 2A:
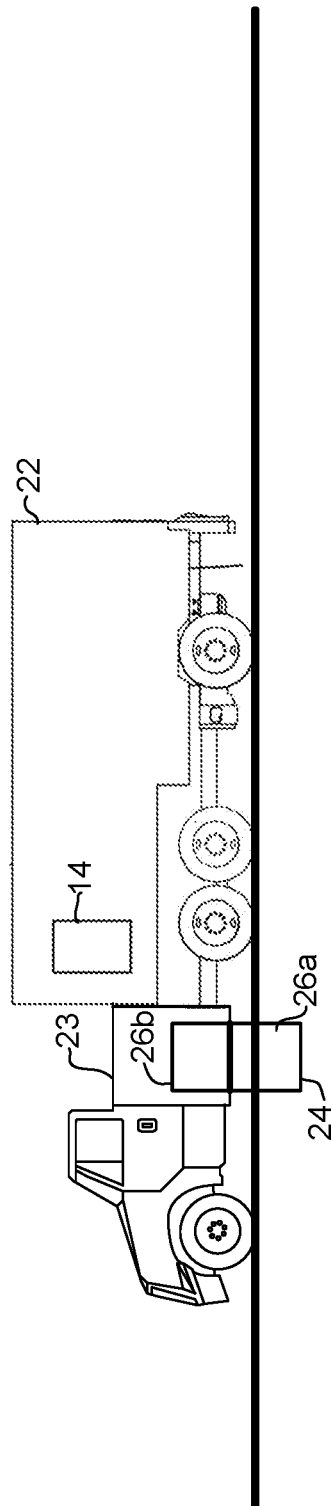
FIG. 2A is another example of an electric vehicle charging station and electric vehicle, in accordance with another embodiment.
Figure 2B:
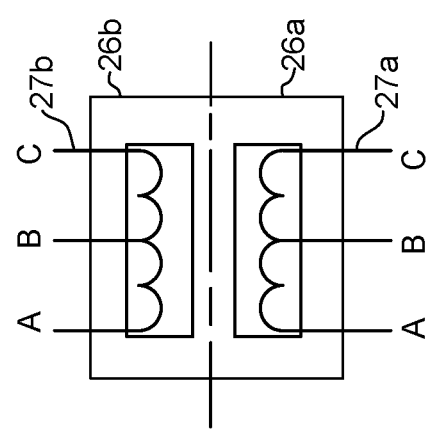
FIG. 2B illustrates a charging circuit of the charging station and charging contact plate on the electric vehicle of FIG. 2A.

FIGS. 2A and 2B illustrate another example of a charging system 24 for charging electric vehicle 22, in accordance with another embodiment. The charging system 24 comprises a magnetic transformer with half of the transformer 26 *a* extending from the ground and the other half of the transformer 26 *b* located on the electric vehicle 22. As shown in FIG. 2A, the electric vehicle 22 drives over the in-ground portion 26 *a* of the transformer and an automatic docking system may be used to align the two portions of the transformer. The example shown in FIG. 2B shows a three-phase transformer with the top half 26*b* configured for installation in the electric vehicle 22 and the lower half 26 *a* configured for installation in the ground, as shown in FIG. 2A. In another example, one half of the transformer may be positioned on top of the electric vehicle with the other half of the transformer lowered onto the contact point. While the electric vehicle is shown as a truck in FIGS. 1 and 2A, one or more embodiments described herein may be applicable to other types of electric vehicles.

In addition to the contact charging arm described above with respect to FIG. 1 and the magnetic transformer described above with respect to FIGS. 2A and 2B, inductive charging may also be used (e.g., with contact at lower surface of truck as shown in FIG. 2A). Inductive charging, however, may present efficiency and size issues. Another charging example includes battery swap out, which may be automated. As described in U.S. patent application Ser. No. 16/983,853 ("Power Distribution and Communications for Electric Vehicle"), filed Aug. 3, 2020, which is incorporated herein by reference in its entirety, a manual connection (plug and cable) may also be used for charging the electric vehicle.

As described below, the charging station may be operable to authenticate with the electric vehicle. In one example, the electric vehicle may subscribe to a service that allows it to use the charging station. In one or more embodiments, the charging station may upload data to perform analytics with respect to battery usage and conditions or download processed information or other data to the electric vehicle while the vehicle is charging. In one or more embodiments, low frequency communications may be used for battery analytics or telemetry.

Figure 3:
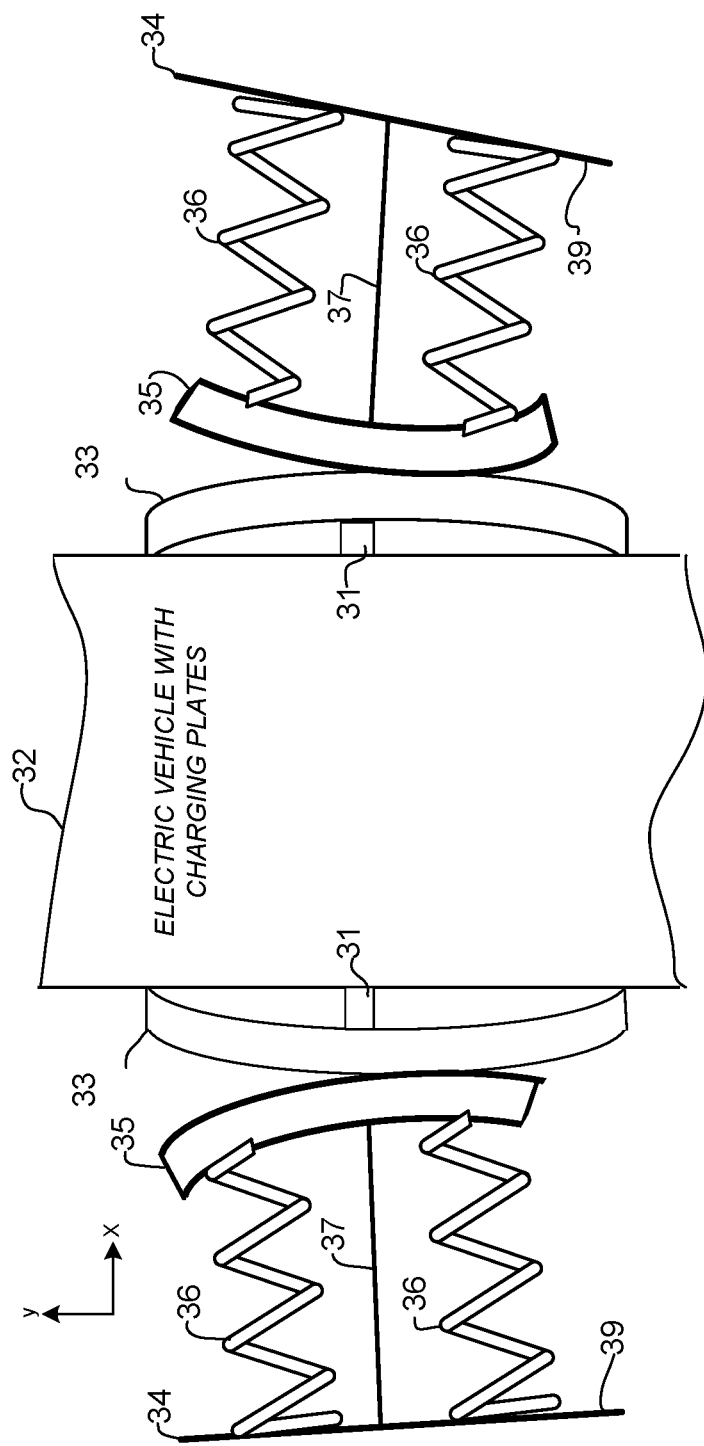
FIG. 3 is a top partial view of the electric vehicle and charging plates on the electric vehicle in contact with charging arms of the charging station, in accordance with one embodiment.

The following describes details of the charging arms 15 and electric vehicle contact plate 19 described above with respect to FIG. 1, in accordance with one or more embodiments. FIG. 3 is a top view of an electric vehicle 32 comprising charging plates 33 positioned on opposite sides of the EV. The charging plates 33 may be configured with one or more contact points (pads) for charging with single-phase or multi-phase pulse power. In the example shown in FIG. 3, the charging station includes at least two charging arms 34 positioned on opposite sides of the EV 32. The charging arm comprises a charging plate 35, which is connected to the charging arm with one or more compressible springs 36 and electrically coupled to one or more flexible cables 37 (or cable with slack to allow for movement of the springs 37) for transmitting FMP (e.g., bi-directional FMP) between the charging station and electric vehicle. The wires transmitting FMP to the charging plate 35 may also be combined with the spring members 36, for example. The FMP received at contact plate 33 is transmitted over one or more connection points 31 electrically coupled to the EV power system (not shown).

The springs 36 allow for movement between a support member 39 and the charging plate 35 to account for positioning tolerances and ensure direct contact between the charging plate 35 and the contact plate 33. The support member 39 may also include an opening for the cable 37 to slide through as the springs are compressed, for example. As shown in the example of FIG. 3, the charging plate 35 and EV contact plate 33 each have a convex outer surface to provide direct contact at the charging contact area on each plate.

In one or more embodiments, the charging arm 34 may be moveable along two or more axis (x-axis, y-axis shown in FIG. 3) to properly align the charging plate 35 with the EV contact plate 33. In one example, the entire charging arm 34 may be initially positioned in the area of the contact plate 33 using information from one or more sensors or switches as previously described, and then moved towards the contact plate 33. The support member 39 may be operable to retract as the electric vehicle 32 is entering or leaving the charging station and extend once the electric vehicle is properly positioned. In another example, the springs 36 may be positioned in a compressed (locked) position and automatically released when the electric vehicle 32 is in position in the charging station. The charging station may automatically send instructions to a driver of the EV or to an autonomous electric vehicle to assist in properly positioning the electric vehicle 32 to align the contact plates 33 with the charging arms 34.

Figure 4A:
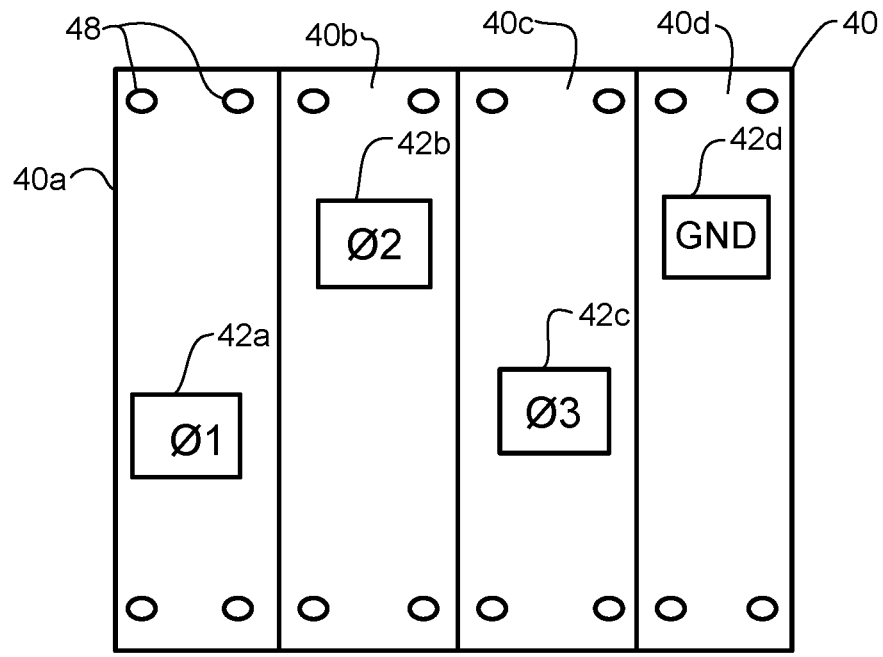
FIG. 4A illustrates a three-phase charging contact plate for the electric vehicle, in accordance with one embodiment.

FIG. 4A is a side view of a charging plate 40 comprising four contact points (areas) 42 a, 42b, 42 c, 42 d, for three-phase DC pulse power charging (phases Ø1, Ø2, Ø3 and ground (GND)). In one example, the charging plate 40 is approximately 2 feet in height with a 4 inch×4 inch contact pad. The plate 40 may be formed, for example, from a copper alloy or any other suitable material. In one example, the plate 40 comprises a carbon plate with copper contact pads 42 a, 42b, 42 c, 42 d. Each pad 42 a, 42b, 42 c, 42 d may be located on individual plates 40a, 40 b, 40c, 40d that are attached to the electric vehicle with fasteners 48 for ease of removal and replacement.

Figure 4B:
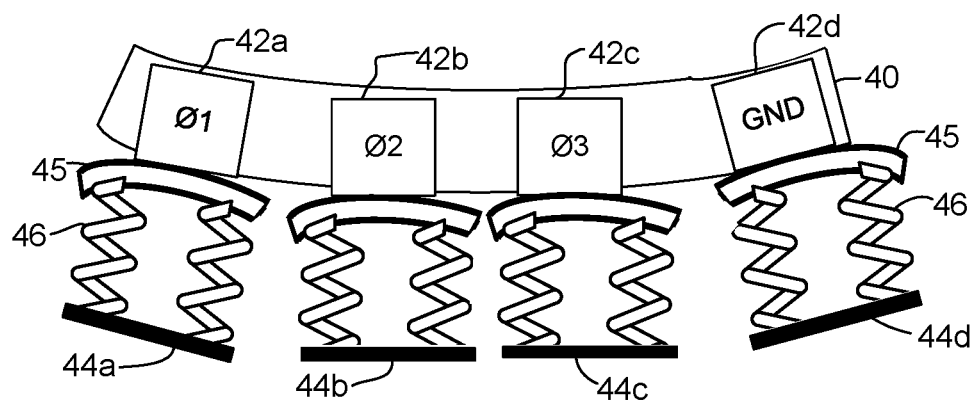
FIG. 4B is a top view of a plurality of individual charging arms mating with the contact plate shown in FIG. 4A, in accordance with one embodiment.

FIG. 4B is a top view of four charging arms 44a, 44b, 44c, 44d, each providing a single-phase or ground connection at contact pads 42a, 42b, 42c, 42c of the EV contact plate 40. As previously described, the charging arm comprises a charging pad 45 coupled to the charging arm with one or more springs 46. The charging arms 44a, 44b, 44c 44d may be coupled together as shown in FIG. 4B or operate independently from one another. As shown in FIG. 4A, the charging plates 45 may be vertically offset from one another. It is to be understood that the arrangement shown in FIGS. 4A and 4B is only an example and the configuration may be different than shown without departing from the scope of the embodiments. For example, a single charging arm may be used to deliver multiple phases of pulse power.

Figure 5:
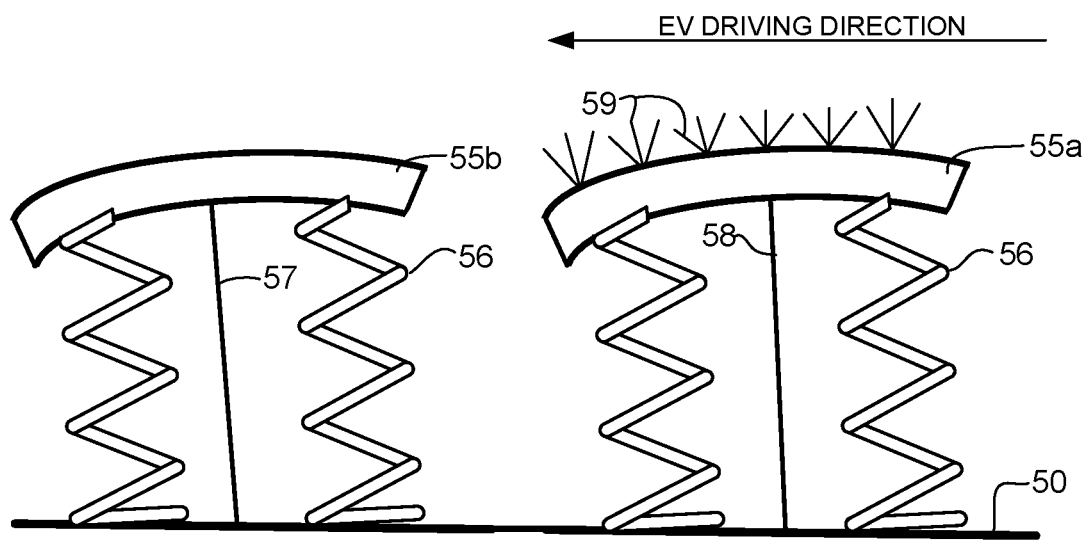
FIG. 5 is a top view of a cleaning arm and charging arm of the charging station, in accordance with one embodiment.

FIG. 5 is a top view of an arm 50 comprising a cleaning arm with a cleaning pad 55a for cleaning the electric vehicle contact plate and a charging arm with charging plate 55b for transmitting power to the cleaned contact plate, in accordance with one embodiment. The driving direction of the electrical vehicle is shown in FIG. 5. As the EV enters the charging station, the contact plate is first exposed to the cleaning pad 55a and as the EV moves forward, the clean contact plate is exposed to the charging plate 55b. The arm 50 may also include a sensor to determine if the contact plate has been sufficiently cleaned of debris to provide a suitable contact for charging. If the contact plate is too dirty to provide direct contact between the charging plate 55b and EV contact plate, the charging station may send a signal to the EV so that it can backup and the contact plate can once again be exposed to the cleaning pad 55a before moving forward for charging.

As shown in FIG. 5, the cleaning pad 55a and charging plate 55b may be connected to the arm 50 with one or more springs 56, as previously described. In the example shown in FIG. 5, the charging and cleaning assemblies are coupled together. In another example, each arm may operate independently from one another. A cable 57 may provide FMP (power, power and data) to the charging plate 55b. The cleaning pad 55a may include a plurality of brushes 59 operable to remove dirt or moisture from the contact plate on the electric vehicle. In another example, the brushes 59 comprise air brushes operable to spray air onto the EV contact plate to clean the plate. Air may be received, for example, from tube 58, which may be formed from a flexible or compressible material. As previously noted, the entire charging arm 50 may be operable to retract or extend or move along one or more axis.

Figure 6:
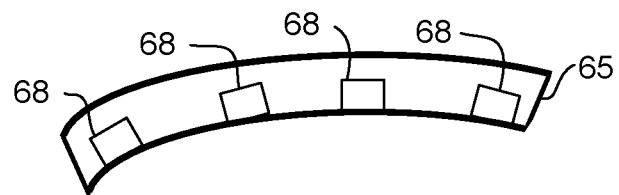
FIG. 6 shows a plate comprising sensors for detecting wear of the plate, in accordance with one embodiment.

Since the plates may be exposed to repeated sliding movement as the charging plate comes into contact with the EV contact plate, the plates may wear over time due to friction between the charging plate and contact plate or repeated exposure to the brushes 59 of the cleaning pad 55a. FIG. 6 is an example of a plate 65 comprising sensors 68 that may be used to indicate wear on the plate. If the plate 65 wears beyond a specified thickness in an area of one or more of the sensors 68, a notification may be sent to the EV or charging station to indicate that the contact plate or charging plate is wearing thin and needs to be replaced soon.

It is to be understood that the charging arms and contact plates shown in FIGS. 3-6 are only examples and different shapes, sizes, curvature, sensors, or alignment mechanisms may be used without departing from the scope of the embodiments.

Figure 7:
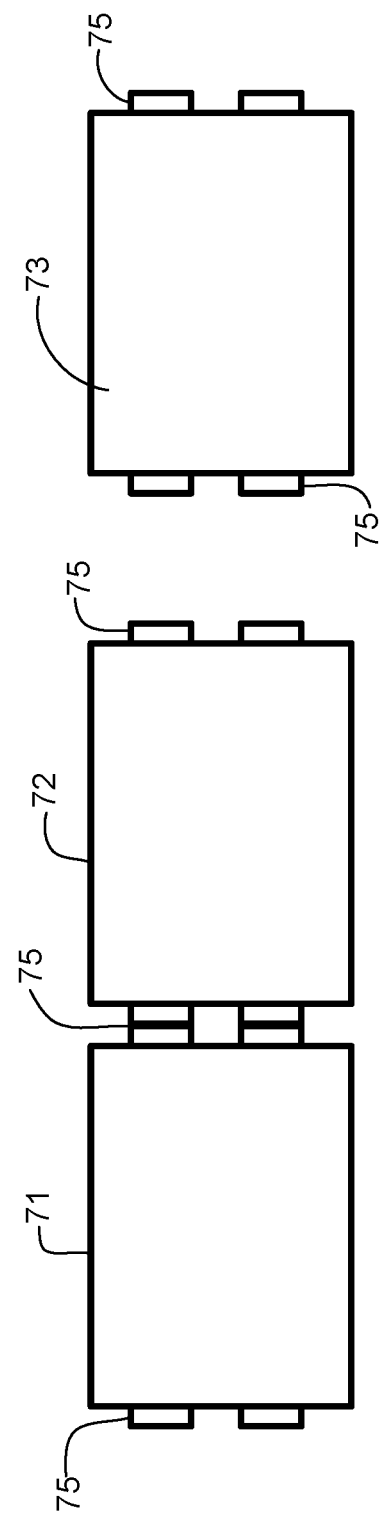
FIG. 7 is a top view illustrating electric vehicles that may be coupled together to provide inter-truck charging, in accordance with one embodiment.

FIG. 7 is a top view of three electric vehicles (e.g., EV trucks) 71, 72, 73. Each of the trucks 71, 72, 73 comprises one or more charging plates 75, which may be located on a front of the truck, rear of the truck, or both front and rear. In this example, the three trucks are traveling together and may share FMP resources and optimize resources for environmental conditions. In the example shown in FIG. 7, trucks 71 and 72 are coupled together for inter-truck charging (power) and one of the trucks may provide power to the other truck through a bi-directional FMP connection at the EV charging plate 75. The truck may provide power without charging the batteries to help a truck low on power get to a charging station, for example. The third truck 73 may also couple with one of the other trucks as needed. In one or more embodiments, communications may be passed between the trucks, with one truck operating as an engine and the other truck operating as a passenger. Acceleration and braking are provided by the vehicle operating as the engine.

In one example, the electric vehicle may be configured to operate in an electric vehicle based data center, as described in U.S. patent application Ser. No. 16/871,877 ("Method and Apparatus for Providing Data Center Functions for Support of an Electric Vehicle Based Data Center"), filed May 11, 2020, which is incorporated herein by reference in its entirety. Use of an electric vehicle based data center in place of a conventional data center eliminates the cost of land, building infrastructure, local and backup power, and wiring and cabling costs for fixed server racks.

Figure 8:
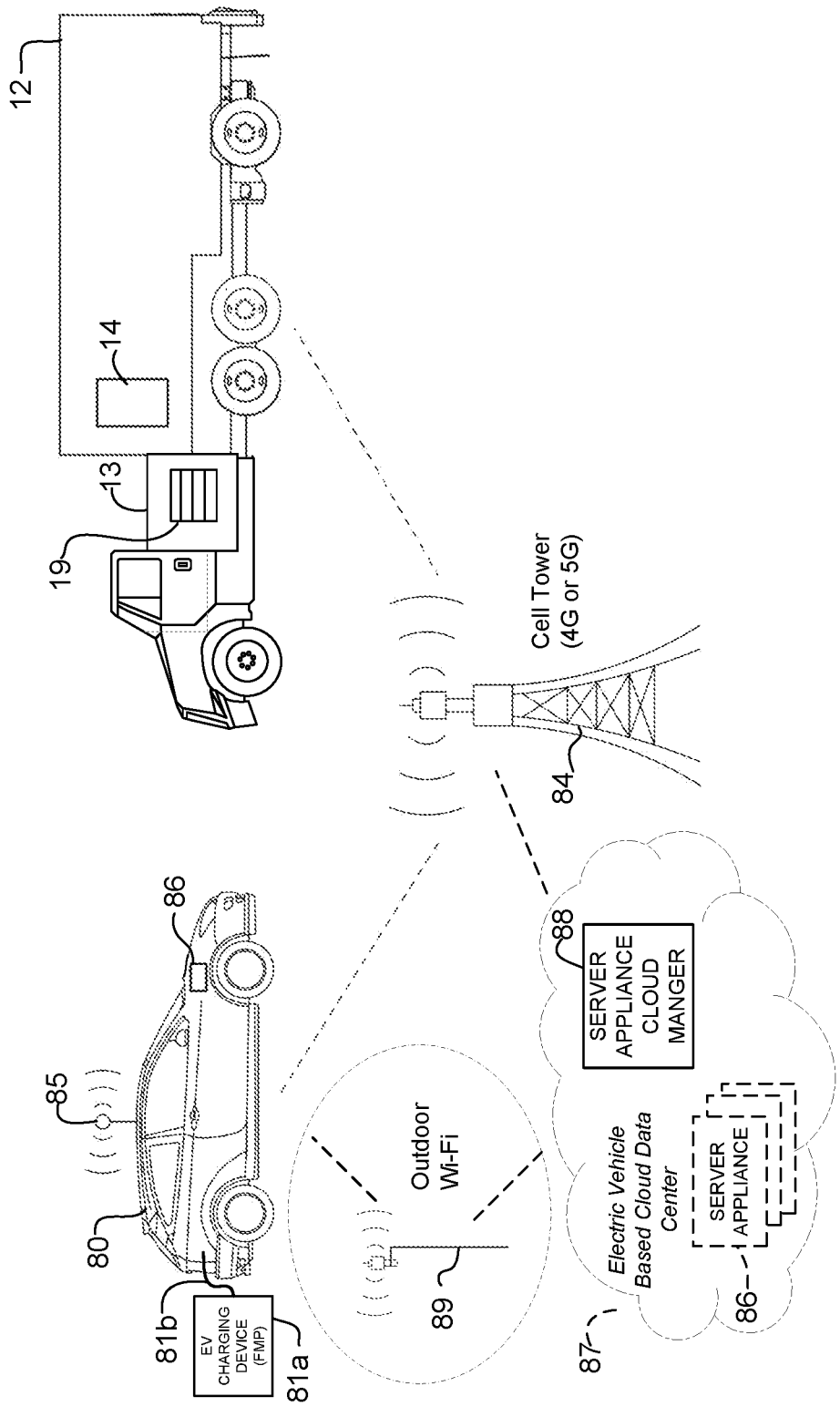
FIG. 8 is an example of an electric vehicle based data center, in accordance with one embodiment.

An example of an electric vehicle (EV) based cloud data center 87, is shown in FIG. 8 in accordance with one embodiment. One or more servers (server blades) are located in an electric vehicle (truck 12, car 80) and interface with a cell tower 84 (e.g., 4G, 5G tower point) through an antenna 85. The server (or servers) and associated components (e.g., router and wireless module) are referred to herein as a server appliance (or communications system) 86 and may be installed in any suitable location within the electric vehicle 80, 12. The truck 12 may comprise a plurality of server appliances in the server appliance rack 14.

The server appliance 86 is contained within a housing, which may be any shape suitable to fit within available space in the EV, preferably without significant impact to operating features of the electric vehicle (e.g., trunk space, vehicle weight). The server appliance or server appliance rack in a truck is preferably configured for ease of installment, modification (e.g., changing number of servers or server appliances based on space availability), or server maintenance or upgrade. The housing may be configured for receiving cooling air through an air inlet, fan, or other means. It is to be understood that the term 'server appliance' or 'communications system' as used herein may refer to any type of structure comprising multiple servers (server blades) and related components and configured for mounting in an electric vehicle.

The electric vehicle based cloud data center 87 is managed by a server appliance cloud manager 88. The server appliance cloud manager 88 may comprise any number of components such as zone managers or regional managers that may communicate with a central office. As shown in FIG. 8, one or more of the electric vehicles may also be in communication with the server appliance cloud manager 88 through Wi-Fi 89 (e.g., outdoor Wi-Fi or other access point (AP) in Wi-Fi network). Communications with the cloud manager 88 or data transfer with another network may also be performed during charging of the electric vehicle at an EV charging device 81*a* through power and data connection (FMP connection) 81*b* or charging station 10 (FIG. 1).

The server appliance cloud manager operates 88 in the electric vehicle based cloud managed data center 87, which distributes data center functions (e.g., collecting, storing, processing, distributing, or allowing access to data) to a plurality of servers (in server appliances 86) located in a plurality of electric vehicles 12, 80. The electric vehicle based data center 87 may provide services including, for example, data storage, data backup and recovery, data processing, data management, data networking, and other services. The electric vehicle based cloud managed data center 87 allocates resources (e.g., processing, memory, local storage, services, network connectivity, or other computing resources) to the servers within the server appliances 86 and may utilize, for example, virtual machines to move resources between servers, microservices for applications, orchestration to manage applications, or any other virtualization tools or virtualized infrastructure that supports applications and workloads across the physical servers and into a cloud environment. The electric vehicle based cloud data center 87 may provide data functions to support and operate as an enterprise data center, hyperscale data center, telecom data center, managed services data center, or any other type of data center. The electric vehicle based data center 87 may include any number of servers (e.g., 500, 1,000, 5,000, 10,000, >10,000, or any other number of servers).

It is to be understood that the network shown in FIG. 8 is a simplified schematic and the network may include any number of server appliances 86 located in any number of electric vehicles 12, 80 in wireless communication over any number of cell towers 84, Wi-Fi networks 89, or other wireless communication stations. Furthermore, the electric vehicles 12, 80 shown in FIG. 8 are only examples and any type of electric vehicle may be used with one or more server appliances positioned in any suitable location within the vehicle. The server appliance 86 may also be configured such that servers or server appliances may be easily added or removed depending on space availability within the electric vehicle for applications such as the truck 12 in which available space may vary depending on the usage. A power and data connector may be positioned at a charging port for receiving power and data from the EV charging device 81*a* at connection 81*b* on EV 80 or at contact plate 19 at EV 12, as described above.

While an example of a EV data center comprising a plurality of electric vehicles in wireless communication is described above with respect to FIG. 8, it is to be understood that the server appliance located in the electric vehicle may only communicate with one or more stationary networks during charging as described below, or may communicate with both the EV mobile data center and communicate with one or more networks during charging.

Figure 9:
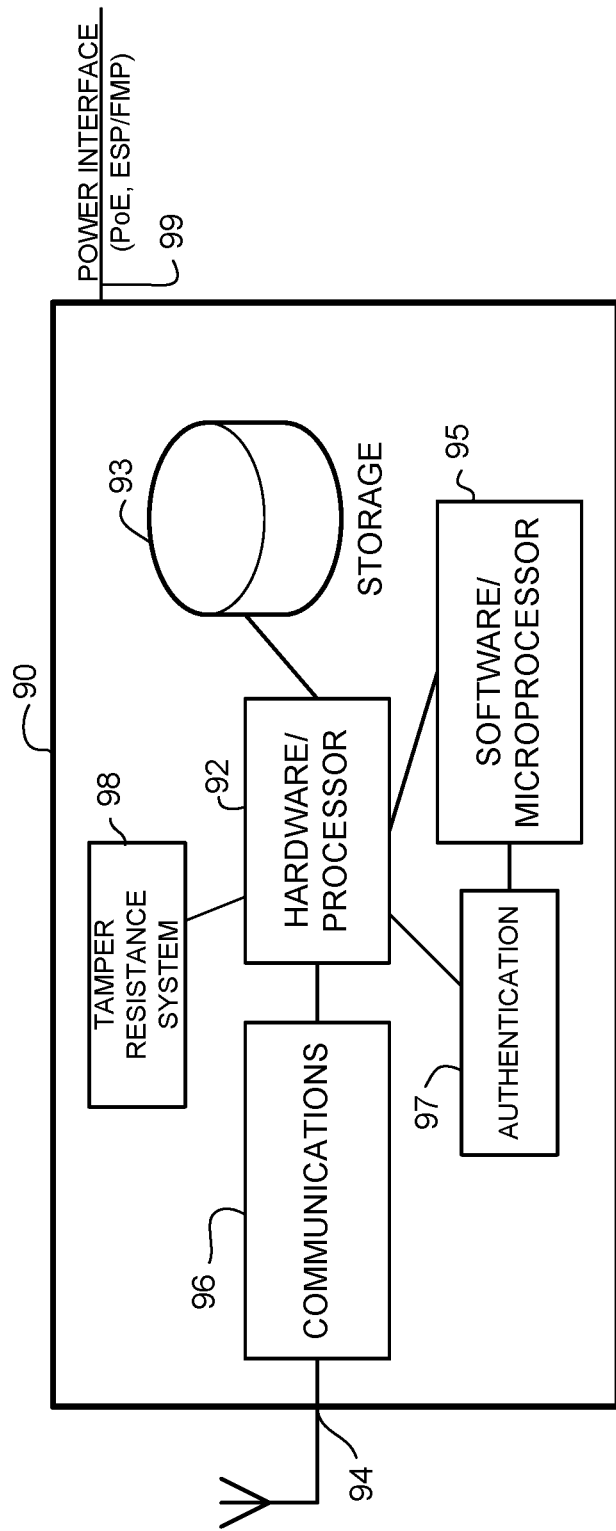
FIG. 9 is a block diagram depicting an example of components that may be used within the electric vehicle or charging station to implement the embodiments described herein.

FIG. 9 illustrates an example of a device 90 (e.g., power system and/or communications system installed at electric vehicle or charging station) that may be used to implement one or more embodiments described herein. In one or more embodiments, the device 90 is a programmable machine that may be implemented in hardware, software, or any combination thereof. The device 90 includes hardware/processor 92, memory (local or cloud storage) 93, wireless interface 94, software 95 (e.g., controller, authentication software, logic, microprocessor), and power and data interface 99.

Storage 93 may be a volatile memory or non-volatile storage, which stores various applications, operating systems, modules, and data for execution and use by the processor 92. The device 91 may include any number of memory components.

Logic (software, firmware, control logic, code) may be encoded in one or more tangible media for execution by the processor 92. For example, the processor 92 may execute codes stored in a computer-readable medium such as memory 93. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The device 91 may include any number of processors 92 or microprocessors. In one or more embodiments, components of the device 91 may be configured to implement processes described below with respect to flowchart of FIG. 13.

The device 91 includes one or more power and data interface 99 to provide power to the components from the electric vehicle battery or power system. Power may be delivered directly from the battery or may be modified for delivery as FMP or PoE as described in detail below.

As shown in FIG. 9, the device 91 may include one or more components to address security. For example, the device 91 may include a communications module 96 comprising one or more security features, hardware/software trust authentication module 97, and a tamper resistant device or mechanism 98, described below with respect to FIG. 10.

It is to be understood that the device 91 shown in FIG. 9 and described above is only an example and that different configurations of devices (with more or fewer components) may be used. For example, the device 91 may further include any suitable combination of hardware, software, algorithms, processors, devices, components, or elements operable to facilitate the capabilities described herein.

Figure 10:
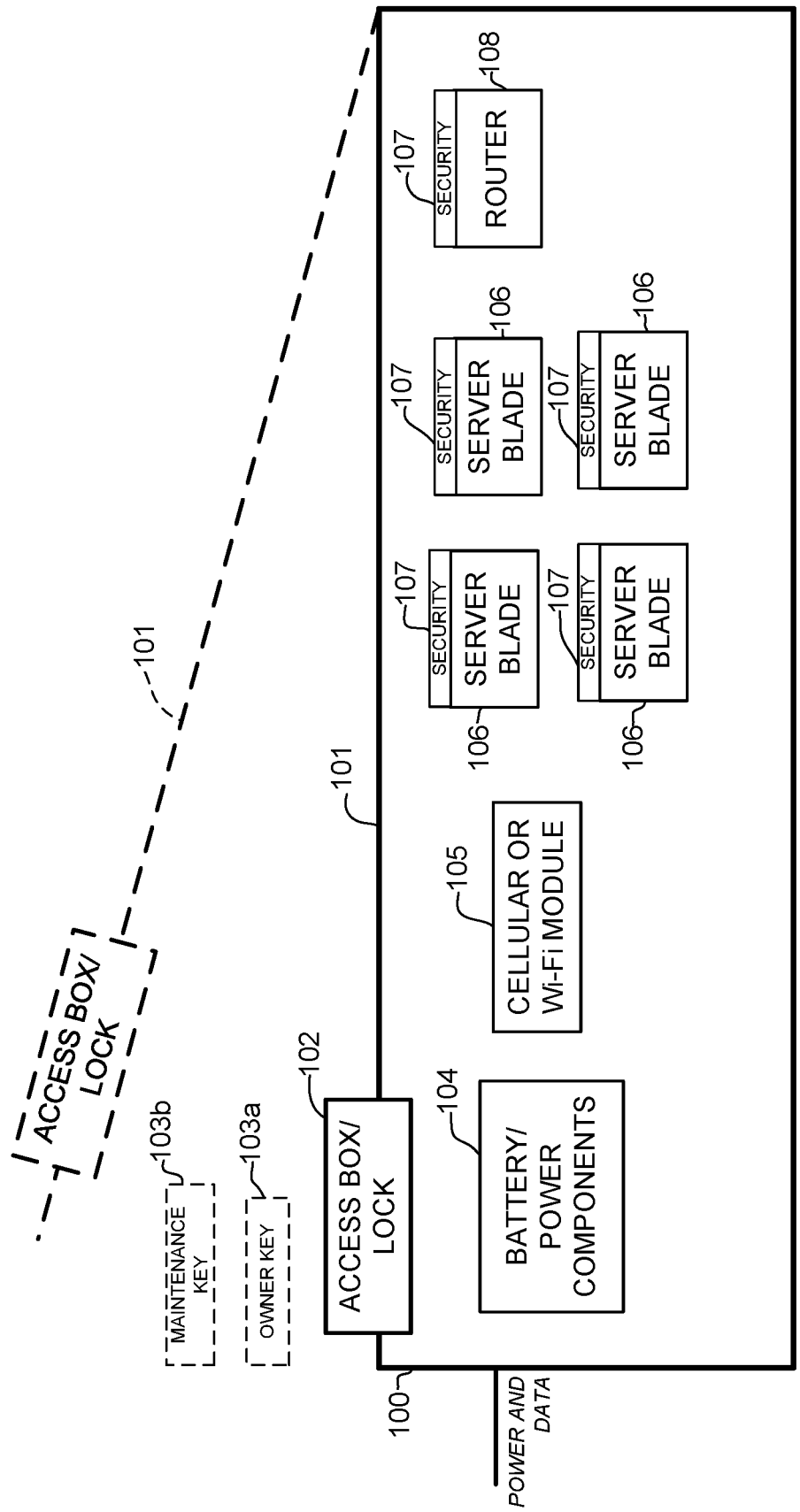
FIG. 10 illustrates a security system for electric vehicle components, in accordance with one embodiment.

As previously noted with respect to FIG. 9, the system may include physical security means that prevent a security breach or tampering with the system. FIG. 10 illustrates an example of a security system that may be included to prevent tampering with one or more power or communications components of the EV. As shown in FIG. 10, one or more components (e.g., battery/power components 104, cellular or Wi-Fi module 105, server blades 106, router 108) may be located in one or more secure containers (housing) 100. While various components are shown within one container 100 in FIG. 10, it is to be understood that components positioned in different locations within the EV or requiring different levels of security may be placed in different containers. As shown in FIG. 10, the secure container 100 is accessed by an access box (lock) 102. The access box 102 may require a key 103a, 103b (e.g., code, thumb print, key card, biometrics and a key, and the like) to open the container (e.g., lift cover 101 to access components within the secure housing 100). Physical access restriction may include the hinged cover 101 and software-actuated latch (access box 102) or other means to ensure system components may only be accessed with proper authorization. Tamper resistance measures may include frangible tapes on container 100 or component housing seams, unique tamper-proof fasteners to deter system intrusion, or software interlocks with the system housing to detect housing removal or intrusions.

As shown in the example of FIG. 10, one or more different types of keys may be used to provide different levels of access to the components (e.g., at access box 102 or individual security elements 107, which may include hardware, software, or a combination thereof). For example, an owner key 103a may allow a user to perform limited updates or changes to the components, while a maintenance key (or combination of owner key and maintenance key) may allow maintenance personnel to perform a different level of updates or replacement of components. Another level of security 107 (hardware or software) may be placed on one or more communications components, for example.

Security measures may be used in tandem with various system accessibility modes including but not limited to "vehicle owner", "maintenance personnel", and "system replacement". For an "owner" mode, system modifications such as adding a new personal device (e.g., a smartphone) to the network may require the proximity of or insertion of the unique owner's car key 103 into the access box 102, or positioning of the key near a location on the dashboard to allow the mobile device inclusion. The term "key" as used herein may include a biometric device (e.g., fingerprint scanner, facial recognition) to be used on its own or in tandem with a physical key (e.g., key card) to validate a user identity. For the "maintenance personnel" mode, in addition to the key 103a (e.g., key card and biometric sensing), the maintenance key 103b may be required to allow further system access, such as to allow direct component testing and diagnostics. The "system replacement" mode may be used when whole or major system sub-components need to be replaced. Further security measures may need to be invoked to support removal and replacement of select components or actions (e.g., MAC address-related items).

In one or more embodiments, a physical security state may be communicated to a management device or controller. If tampering with the system is identified, the server may shut down or not boot and a warning message may be generated. A key may also be required with user authentication. As described below, additional security including trust and authentication may be performed between system components or between the charging station and the electric vehicle.

Figure 11:
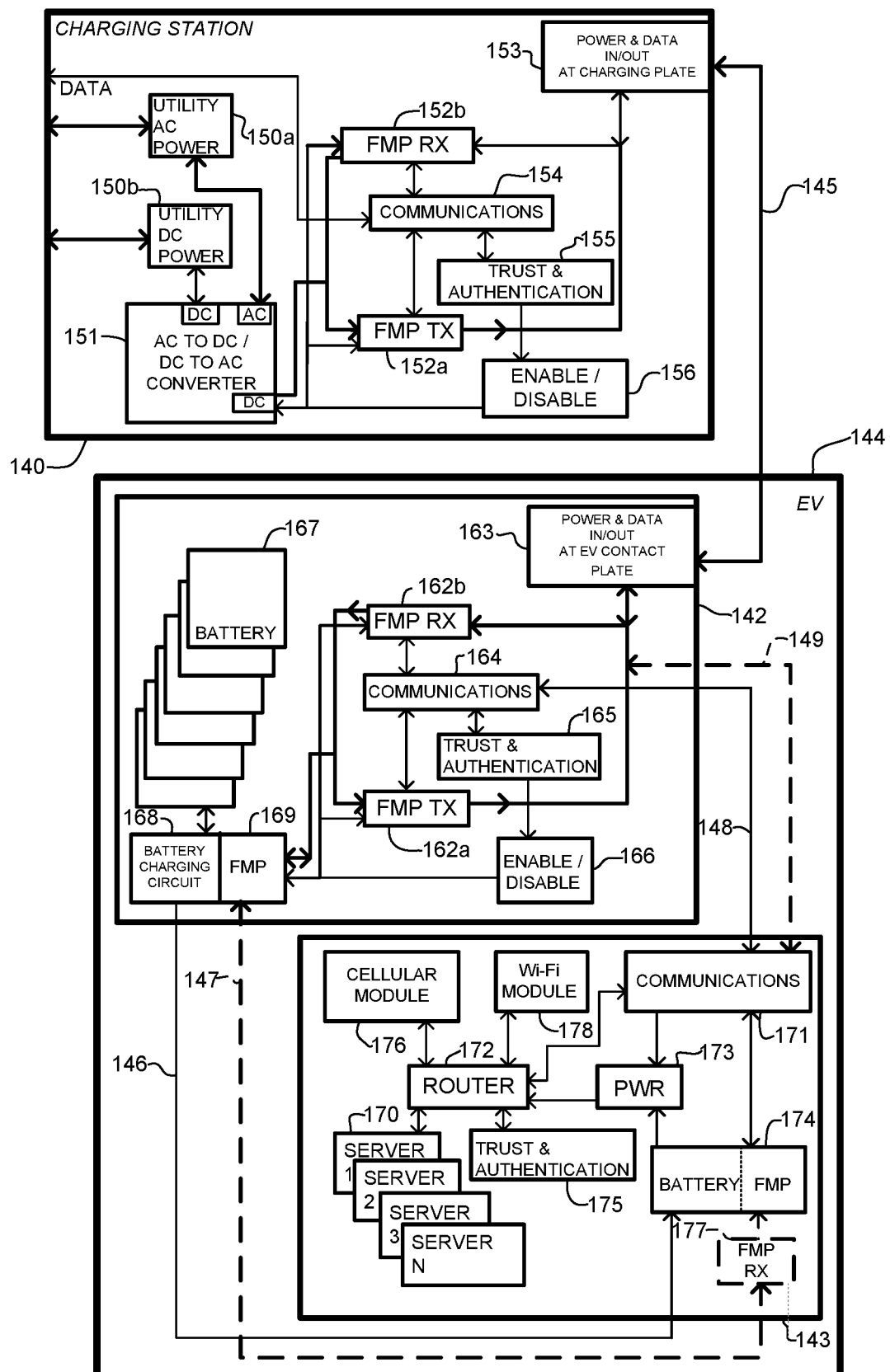
FIG. 11 is a block diagram illustrating an overview of an electric vehicle charging device connected to a power system and communications system at the electric vehicle, in accordance with one embodiment.

FIG. 11 is a block diagram illustrating interfaces between an EV charging device (charging station) 140 and a power system (battery charging unit, power device, power distribution system) 142 and communications system (server appliance, communications device, server/data communications components) 143 at an electric vehicle 144, in accordance with one embodiment.

In one or more embodiments, an electric vehicle system comprises the power system 142 for charging a battery 167 installed in the electric vehicle 144 and a contact plate 163 for positioning on an exterior surface of the electric vehicle and transmitting power to the power system (FIG. 11). As previously described with respect to FIG. 1, the contact plate 19 is configured for receiving pulse power (e.g., single-phase 16 or multi-phase 16a, 16b, 16c) comprising a plurality of high voltage pulses 18b with safety testing between high voltage pulses, directly from the charging plate 35 (FIG. 3) coupled to the charging arm 34 at the charging station and transmitting the pulse power to the power system.

While the power system 142 and the communications system 143 are schematically shown as individual devices, the systems may be combined and one or more components shared (e.g., FMP TX, FMP RX, communications or authentication module). For example, reference to the communications system 143 transmitting or receiving data to or from the power system 142 may comprise transmitting or receiving data directly to or from a bi-directional power and data connector at the power system. Also, as described below, the power system 142 and communications system 143 are both configured for transmitting or receiving FMP comprising both power and data. Thus, it is to be understood that while the power system's primary function is battery charging and power distribution, the power system also handles data communications. Similarly, while the communications system's primary function is server/data communications, it may also be configured to receive FMP (power and data) from the power system.

The EV charging device 140 may comprise the charging station described above. Power received at the EV charging device 140 may be, for example, utility AC (Alternating Current) power, or DC (Direct Current) power, or power from a solar power system or wind power system (e.g., 380 VDC or other voltage). The EV charging device 140 may be coupled to a data source (e.g., Internet or other data network). Received power and data are combined and converted to Fault Managed Power (FMP) and transmitted to the power system 142 in the electric vehicle 144. The FMP may also be received from the power system 142 at the EV. The power system 142 comprises a bi-directional FMP multi-drop system that allows the utility power, the EV battery, or other sources such as solar or regenerative motor energy to power the EV systems. The embodiments described herein allow for conversion of an entire EV power distribution system to FMP in a single pair or multi-pair system, thereby eliminating heavy wiring and allowing for the use of light gauge wire throughout the electric vehicle, while providing safety features. For example, the use of FMP (power and data with safety features) for all power systems from or to the battery or utility power provides for safe interaction when emergency personnel are responding to an electric vehicle incident.

The bi-directional FMP is coupled to the electric vehicle 144 at the power system 142 through connection 145 (e.g., charging arm described above for contact with the EV contact plate 163 at the EV). In one or more embodiments, connection 145 may also provide high speed communications over the bi-directional FMP distribution system, thereby allowing for higher speed downloading and uploading to and from the EV servers (at communications system 143) than provided using Wi-Fi or cellular. The power and data connection 145 may comprise, for example, two wires for a single-phase FMP system, six wires (three wire pairs) for three phase (multi-phase) FMP system, or any other number of wires (wire pairs) for any number of phases in a multi-phase system.

The power system 142 may power components at the communications system (server appliance) 43 using conventional power from the battery at connection 146 or through a safer FMP connection 147. The power system 142 may also include a data connection 148 or an FMP connection 149 to the communications system 143 to provide high speed communications during charging. It is to be understood that only one power connection type (146 or 147) and one data connection type (148 or 149) may be provided between the power system 142 and the communications system 143. In another example, only one FMP (power and data) connection is provided between the power system 142 and communications system 143.

A trust and authentication system and method may be provided to authenticate the fault managed power and FMP based communications throughout the EV and EV mobile data center functions, thereby allowing for a secure trust layer to ensure that the communications and charging power are all trusted. In one or more embodiments, trust and authentication are provided at the EV charging device 140, power system 142, and server data communications unit 143. The trust and authentication system verifies proper FMP transmitter to FMP receiver interfaces and connections allow only trusted devices to transmit or receive FMP. In the charging system, trust and authentication may be used to prevent destruction of charging systems in public locations.

As previously noted, utility power or power from solar or wind systems may be used to provide power at the EV charging device 140. The block diagram in FIG. 11 illustrates utility AC power received at block 150*a* and DC power received at block 150*b*. These are only examples and the charging unit 140 may be configured for receiving any type of usable power from any source. For example, the bi-directional FMP may be converted from or to power at mobile batteries or a stationary battery system. Power is input to power module 151, which may be configured to convert AC power to DC power or convert DC power to AC power. The power module 151 transmits power to an FMP system comprising an FMP transmitter (TX) 152*a* and FMP receiver (RX) 152*b*. Power and data received at FMP transmitter 152*a* is converted to FMP and delivered to a power and data in/out connector (charging plate) 153 for transmittal to the EV at connection 145. Power received at the power and data connector 153 may also be transmitted to the FMP receiver 152*b* and converted to DC power use by other systems.

Data (e.g., Internet data or other network data) is received and transmitted at communications block 154. The data is provided to the FMP transmitter 152*a* for transmittal to the EV at the power and data connector 153. Data may also be received from the FMP receiver 152*b* for upload to a network at the communications block 154. In the example shown in FIG. 11, the communications block 154 is in communication with a trust and authentication module 155 for performing authentication functions. The trust and authentication module 155 is in communication with an enable/disable block 156, which may shut down power and data at power module 151, FMP TX 152*a*, or FMP RX 152*b* if authentication fails.

Power and data are received or transmitted at power and data in/out connector (EV contact plates) 163, which is coupled to the EV charging device 140 at connection 145. It is to be understood that the term "connector" as used herein may refer to a plug type connector or a plate for contact with a charging arm coupled to the EV charging device 140, as described above. The power system 142 includes an FMP system comprising an FMP transmitter 162*a*, FMP receiver 162*b*, communications block 164, trust and authentication module 165, and enable/disable block 166 as described above for the EV charging device 140. The trust and authentication module 165 at the power system 142 is used to establish that the power system and a valid EV charging device are directly connected without any middle connection or invalid (unauthorized) charging system.

The FMP system is coupled to a battery charging circuit 168 through FMP block 169, which converts the FMP to power suitable for the battery charging circuit. One or more EV batteries 167 are charged by the battery charging circuit 168. As previously described, the power system 142 may transmit power directly from the battery charging circuit 168 to the communications system 143 on power line 146 or transmit FMP over line 147. Data may be transmitted directly from communications block 164 to the communications system 143 over line 148 or data and power may be transmitted from the FMP system over line 149 in a multi-drop configuration.

The communications system includes a cellular module 176 and a Wi-Fi module 178 in communication with a router 172. The router 172 is in communication with one or more servers 170 (Server 1, Server 2, Server 3, Server N). In one example, power and data are received from the power system 142 at connection 149 and power and communications are split at a communications module 171 (FMP communications module) (FIGS. 6 and 7). The communications module 171 may transmit data at 1 GE-10 GE to the router 172 and transmit power to power module 173, for example. In another example, the communications module receives data from the power system at connection 148. The communications module 171 may include a bi-directional FMP connection with battery/FMP module 174. As previously described, the power system 142 may transmit battery power directly to the battery at line 146 or the communications system 143 may include an FMP receiver 177 for receiving FMP (power and data) at line 147. The communications system 143 also includes a trust and authentication module 175 to provide authentication with the power system 142 before data transfer is permitted.

Figure 12:
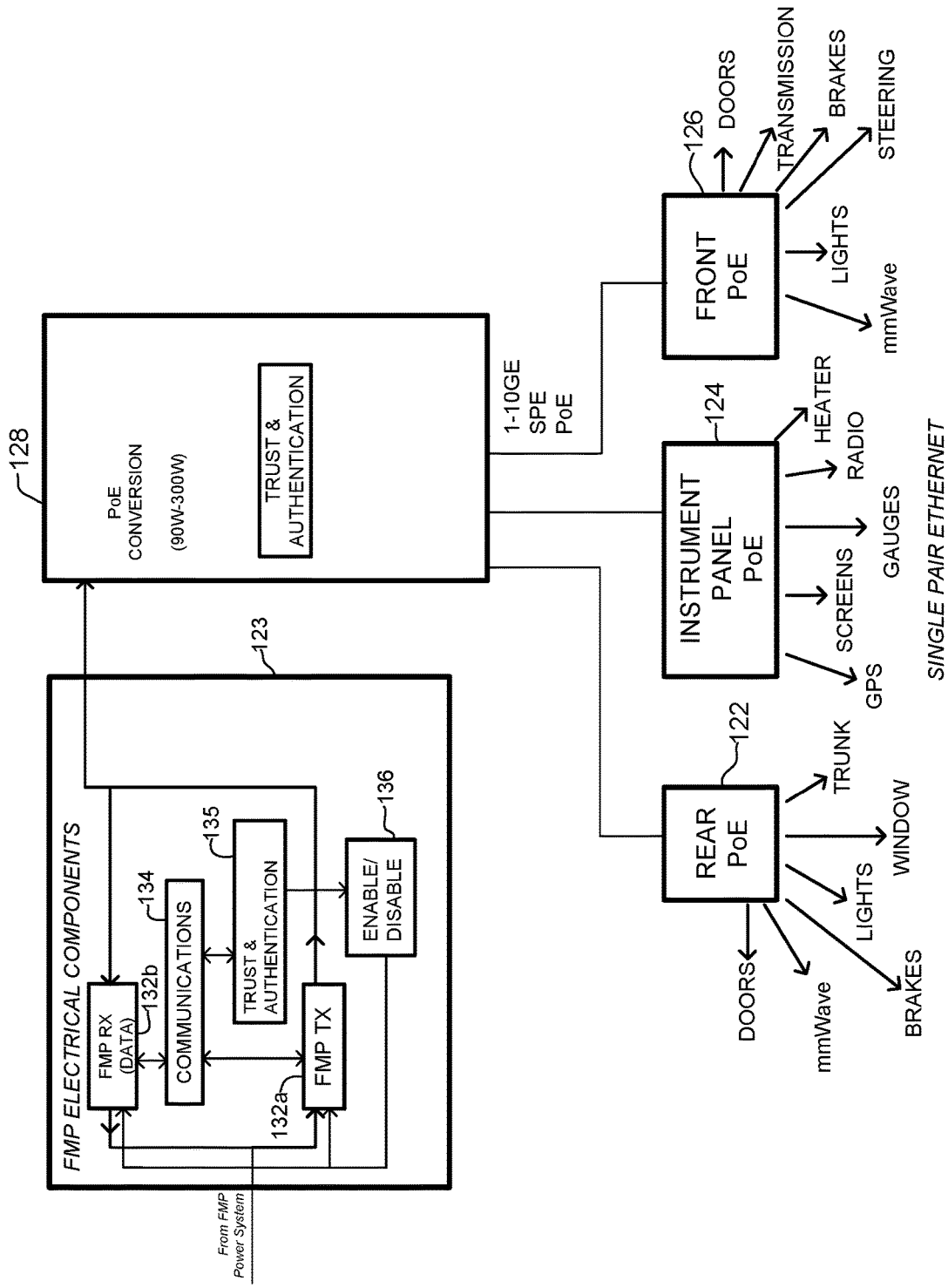
FIG. 12 is a block diagram illustrating power distribution to power components in the electric vehicle, in accordance with one embodiment.

FIG. 12 illustrates details of power distribution to electrical components in the electric vehicle, in accordance with one embodiment. The FMP power system described above with respect to FIG. 11 may be used to power electrical components installed in the electric vehicle. In one or more embodiments, an electrical components device 123 includes an FMP transmitter 132*a*, FMP receiver 132*b*, communications module 134, trust and authentication module 135, and enable/disable block 136 as previously described with respect to the power system. It may be noted that the receiver block 132*b* at the electrical components device 123 may be configured only as a data receiver since power is only transmitted to the electrical components and not received therefrom, but the communication functions are still needed for data received over FMP. The electrical components device 123 transmits power and bi-directional communications to power electronic components at the EV.

In one example, single pair FMP is used to transmit power and bi-directional communications to various electrical components at the EV. The single pair FMP may comprise low power multi-drop FMP and up to 10 GE data communications over the FMP lines, for example. In the example shown in FIG. 12, the single pair FMP is converted to Single Pair Ethernet (SPE) at conversion unit 128. In one example, the SPE comprises 90 watt to 300 watt power and 1-10 GE data. The system may include, for example, a rear PoE unit 122, an instrument panel PoE unit 124, and a front PoE unit 126, each providing power and data through SPE to a group of electrical components. In one example, the rear PoE unit 122 is in communication with doors, an mmWave (millimeter wave) device, rear brakes, lights, windows, and trunk.

The instrument panel PoE unit 124 is in communication with GPS (Global Positioning System), screens, gauges, radio, and heater. The front PoE unit 126 is in communication with an mmWave device, lights, steering, brakes, transmission, and doors. These electrical components may be on the same network as the cloud data center and include trust components or may be on a separate network. In one or more embodiments, the electrical components SPE network may be isolated at components 122, 124, 126 to prevent attack of the EV communications system. It is to be understood that the electrical components shown in the SPE network of FIG. 12 are only examples and fewer components, additional components, or different electrical components may be powered and controlled by the FMP system described herein.

The systems shown in FIGS. 11-12 may transfer power, data, or power and data on any suitable connection, including, for example, single pair wire (e.g., single twisted pair, single balanced copper wire pair, single wire pair Ethernet) located in single pair cable (e.g., SPE, Base-T1 Ethernet) or multiple wire pairs located in a multi-pair cable (e.g., two-pair cable, four-pair cable, Base-T1 Ethernet), for example.

Figure 13:
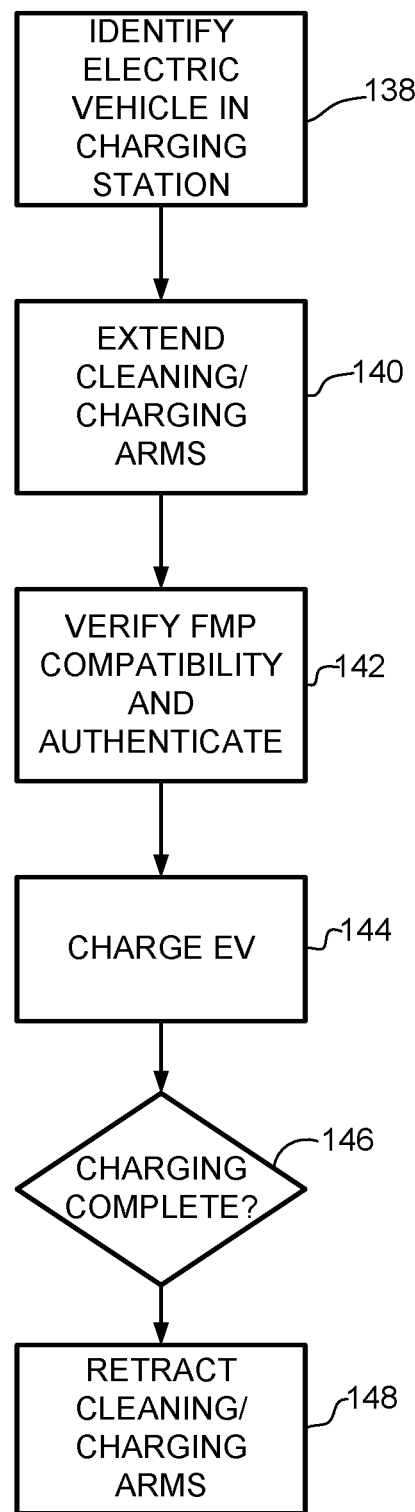
FIG. 13 is a flowchart illustrating an overview of a process for charging the electric vehicle at the charging station, in accordance with one embodiment.

FIG. 13 is a flowchart illustrating an overview of a process for charging an electric vehicle using fault managed power, in accordance with one embodiment. At step 138, the charging station identifies an incoming electric vehicle (FIGS. 1 and 13). This may be accomplished, for example, through cellular or Wi-Fi communications, GPS coordinates, sensors, or other means. The charging station may extend one or more charging arms (and cleaning arms) (step 140). As previously described, alignment may be performed using sensors, switches, or any other suitable means. Once the charging plate of the charging arm is in contact with the EV contact plate, a compatibility check may be performed along with authentication between the charging station and EV power system (step 142). The FMP may be shutoff at the charging station and initiated upon identification of the EV entering the charging station or upon alignment and contact between the charging plate and EV contact plate. In one or more embodiments, an FMP initialization process and safety check may be performed to verify proper contact between the plates to provide safe charging. As previously described, the FMP comprises pulse power with fault sensing between high voltage pulses, therefore providing continuous safety checks throughout the charging process (step 144). If compatibility or authentication is not successfully performed or a fault is detected prior to or during the charging process, the charging is immediately stopped. As previously described, the fault sensing provided in FMP allows for an unintentional load to immediately stop all power delivery. As described above, data may also be uploaded or downloaded during the charging process using the same wires used to transmit power. Once charging is completed (step 146), the charging arm (charging arms, cleaning arms) are retracted (step 148) and the EV may leave the charging station.

It is to be understood that the process shown in FIG. 13 is only an example and that steps may be added, removed, combined, or modified without departing from the scope of the embodiments.

Although the systems, methods, and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
a power source; and
a moveable charging arm coupled to the power source and comprising a charging plate for direct electrical contact with an electric vehicle having a contact plate;
wherein the moveable charging arm is operable to transmit direct current pulse power with ground fault testing performed between high voltage pulses directly from the charging plate to the contact plate to charge one or more batteries at the electric vehicle, and
wherein the ground fault testing is performed, at initialization, at a first periodicity, and performed, during a subsequent operation, at a second periodicity that is longer than the first periodicity.

2. The apparatus of claim 1, wherein the ground fault testing comprises at least one of line-to-line and line-to-ground testing.

3. The apparatus of claim 1, wherein the apparatus employs auto-negotiation between power components.

4. The apparatus of claim 1, wherein the direct current pulse power comprises multi-phase pulse power.

5. The apparatus of claim 4, wherein the moveable charging arm comprises a plurality of charging plates for the multi-phase pulse power.

6. The apparatus of claim 1, further comprising a sensor for automatically positioning the moveable charging arm for contact with the contact plate.

7. The apparatus of claim 1, further comprising a cleaning arm for cleaning the contact plate prior to contact with the moveable charging arm.

8. The apparatus of claim 1, wherein the charging plate comprises a wear sensor.

9. The apparatus of claim 1, further comprising a second moveable charging arm for contact with a second electric vehicle contact plate positioned on an opposite side of the electric vehicle.

10. The apparatus of claim 1, wherein the charging plate comprises a convex surface for contact with a contact area on the charging plate.

11. The apparatus of claim 1, wherein the power source comprises a power converter for converting alternating current (AC) power to the direct current pulse power.

12. The apparatus of claim 1, wherein the moveable charging arm transmits or receives communications along with the direct current pulse power.

13. An electric vehicle system comprising:
a power system for charging a battery installed in an electric vehicle; and
a contact plate for positioning on an exterior surface of the electric vehicle and transmitting power to the power system;
wherein the contact plate is configured for receiving pulse power comprising a plurality of high voltage pulses with ground fault safety testing between high voltage pulses of said plurality of high voltage pulses, and wherein the pulse power is applied from a charging plate coupled to a charging arm at a charging station and transmitting the pulse power to the power system via direct electrical contact between the contact plate and a moveable charging arm, and
wherein the ground fault safety testing is performed, at initialization, at a first periodicity, and performed, during a subsequent operation, at a second periodicity that is longer than the first periodicity.

14. The electric vehicle system of claim 13, further comprising a communications system comprising a server and configured for receiving data from or transmitting the data to the power system for download or upload at the contact plate.

15. The electric vehicle system of claim 14, further comprising a security system for preventing unauthorized access to one or more components of the power system or the communications system.

16. The electric vehicle system of claim 13, wherein the pulse power comprises multi-phase pulse power.

17. A method comprising:
   identifying an electric vehicle in a charging station;
   automatically positioning a charging arm in contact with a contact plate on an exterior surface of the electric vehicle;
   verifying compatibility of a power system at the electric vehicle with fault managed power;
   performing authentication between the charging station and the electric vehicle; and
   charging a battery at the electric vehicle with the fault managed power including ground fault safety testing between high voltage pulses of direct current pulse power while the charging arm and the contact plate are in direct electrical contact with one another,
   wherein the ground fault safety testing is performed, at initialization, at a first periodicity, and performed, during a subsequent operation, at a second periodicity that is longer than the first periodicity.

18. The method of claim 17, further comprising transmitting or receiving communications along with the direct current pulse power.

19. The method of claim 17, wherein the fault managed power comprises multi-phase direct current (DC) pulse power.

20. The method of claim 17, wherein the ground fault safety testing comprises at least one of line-to-line and line-to-ground testing.

* * * * *